(12) United States Patent
Barlasov (10) Patent No.: US 10,336,002 B2
(45) Date of Patent: Jul. 2, 2019

(54) METHOD AND APPARATUS FOR HIGH SPEED PLASTIC STRAPPING WELDING

(71) Applicant: Pavlo Barlasov, Palo Alto, CA (US)

(72) Inventor: Pavlo Barlasov, Palo Alto, CA (US)

(73) Assignee: Pavlo Barlasov, Palo Alto, CA (US)

( * ) Notice: Subject to any disclaimer, the term of this patent is extended or adjusted under 35 U.S.C. 154(b) by 115 days.

(21) Appl. No.: 15/083,147

(22) Filed: Mar. 28, 2016

(65) Prior Publication Data

US 2016/0207250 A1    Jul. 21, 2016

Related U.S. Application Data

(63) Continuation-in-part of application No. 14/069,231, filed on Oct. 31, 2013, now Pat. No. 9,308,687.

(60) Provisional application No. 61/841,901, filed on Jul. 1, 2013.

(51) Int. Cl.
  *B29C 65/00*   (2006.01)
  *B29C 65/06*   (2006.01)
  *B29L 31/00*   (2006.01)
  *B29K 67/00*   (2006.01)

(52) U.S. Cl.
  CPC ...... *B29C 65/0618* (2013.01); *B29C 66/1122* (2013.01); *B29C 66/4324* (2013.01); *B29C 66/8161* (2013.01); *B29C 66/8163* (2013.01); *B29C 66/81433* (2013.01); *B29C 66/8227* (2013.01); *B29C 66/82265* (2013.01); *B29C 66/855* (2013.01); *B29K 2067/00* (2013.01); *B29L 2031/7276* (2013.01)

(58) Field of Classification Search
  CPC ............. B29C 65/0618; B26C 66/1122; B26C 66/4324; B26C 66/8143; B26C 66/8161; B26C 66/8163; B26C 66/82265; B26C 66/8227; B26C 66/855
  See application file for complete search history.

(56) References Cited

U.S. PATENT DOCUMENTS

| | | | | |
|---|---|---|---|---|
| 1,477,538 A | * | 12/1923 | Carter ..................... | B23K 5/06 |
| | | | | 219/137.7 |
| 3,554,846 A | | 1/1971 | Billett | |
| 4,247,346 A | | 1/1981 | Maehara et al. | |
| 4,858,815 A | | 8/1989 | Roberts et al. | |
| 4,923,558 A | * | 5/1990 | Ellenberger ........ | B29C 66/1122 |
| | | | | 100/171 |

(Continued)

FOREIGN PATENT DOCUMENTS

EP    1824738 B1    4/2008

*Primary Examiner* — Michael N Orlando
*Assistant Examiner* — Matthew Hoover
(74) *Attorney, Agent, or Firm* — David Lewis (57) ABSTRACT

An apparatus for producing an improved friction-fused welded joint is provided for use with overlapping thermoplastic strap portions. In an embodiment, the gripper is caused to swing back and force with a sufficiently large stroke and with a sufficiently fast stroke to cause sufficient reciprocation to rapidly heat the thermoplastic so that the two straps are welded together while reducing the depth of the area that is melted compared to traditional methods. Also, in an embodiment, a method is provided for stopping the relative motion of the two portions of straps with the portions of the plastic straps oriented in the same aligned relative positions at the end of the welding operation as at the beginning is disclosed.

4 Claims, 9 Drawing Sheets

(56) References Cited

U.S. PATENT DOCUMENTS

| | | |
|---|---|---|
| 8,070,039 B1 | 12/2011 | Johnson et al. |
| 8,181,841 B2 | 5/2012 | Johnson et al. |
| 8,376,210 B2 | 2/2013 | Johnson et al. |
| 9,308,687 B2 | 4/2016 | Barlasov |
| 2006/0113358 A1* | 6/2006 | Crasser .............. B23K 20/1205 228/112.1 |

* cited by examiner

FIG. 1

Prior Art

METHOD AND APPARATUS FOR HIGH SPEED PLASTIC STRAPPING WELDING

CROSS-REFERENCE TO RELATED APPLICATIONS

This application is a continuation-in-part of U.S. patent application Ser. No. 14/069,231, entitled "METHOD AND APPARATUS FOR HIGH SPEED PLASTIC STRAPPING WELDING" filed Oct. 31, 2013, by Pavlo Barlasov, which in turn claims priority benefit of U.S. Provisional Patent Application No. 61/841,901, entitled "METHOD AND APPARATUS FOR HIGH SPEED PLASTIC STRAPPING WELDING" filed Jul. 1, 2013, by Pavlo Barlasov. All of the above applications are incorporated herein by reference.

FIELD OF THE INVENTION

This invention relates to a process and an apparatus for welding straps made of thermoplastic plastics, particularly packaging straps made of polyester or the like.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Some prior art patents are U.S. Pat. No. 3,554,846 R. J. BILLETT 1971, U.S. Pat. No. 4,247,346 Kazuo Maehara, 1978, U.S. Pat. No. 4,858,815 Derek A. Roberts, 1989; EP 1824738 B1, Steve Aemisegger, 2005, U.S. Pat. No. 8,070,039 B1, Stephen A. Johnson 2010, U.S. Pat. No. 8,181,841 B2, Stephen A. Johnson 2011, U.S. Pat. No. 8,376,210 B2, Stephen A. Johnson 2012.

The welding process typically involves pressing one of the two strap portions against the other strap portion, so that the two strap portions overlap one another, with a force to create pressure holding the two strap portions together. One of the two straps is rapidly moved relative to the other strap to generate friction at the area of interface between the two straps. The pressure and movement generate sufficient heat to cause the components to begin to melt. Once the two straps are melted at the point of contact, the movement of the two straps is terminated, and the two straps are allowed to cool down while under a pressure pushing the two strap portions together. As the straps cool down in this static condition, a welded joint is formed at the interface where the two strap portions contact one another. The welding process may be applied to polyester strap with 16 mm width and 1 mm thickness and breaking strength of about 650 kg, for example.

Figure 1:
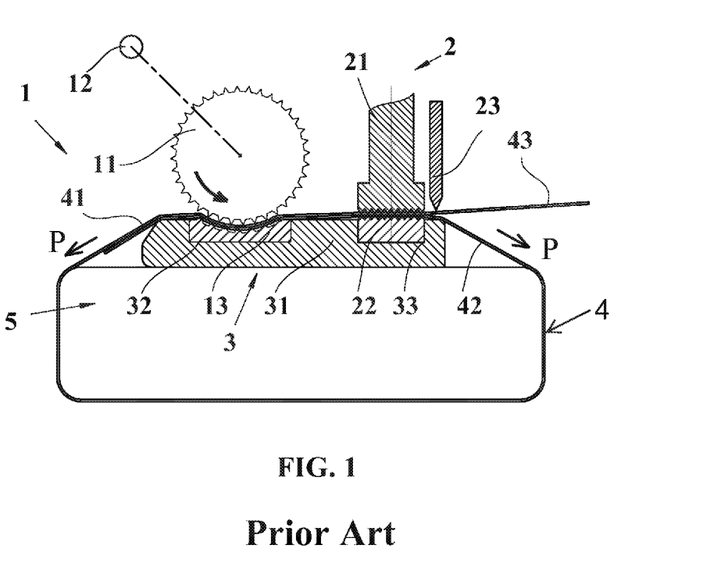
FIG. 1 is a view schematically illustrating a conventional strapping tool and a strap tightened about an article.

Conventionally produced welded joints in thermoplastic straps have found wide commercial acceptance in many applications. However, the welding process of creating such joints has limitations. Referring to FIG. 1, one of two straps typically, lower strap 41, is the stationary strap, is loaded with tension force P during the welding operation. The conventional welding process requires a certain period of time to melt the material in the contact area. In that period of time, portions deep within the lower strap warm up, which reduces the cool cross section and therefore dramatically lowers breaking strength of the lower portion of the strap. Consequently, most plastic strapping apparatuses do not allow the strap to be tensioned more than 35% of the breaking strength of the strap and therefore do not utilize all of the capability of this expensive strap.

There are known methods and apparatuses that attempt to locate the welding surfaces in a predetermined position, by for example, using a combination of (1) forces of inertia to increase stroke from zero to a maximum and (2) a spring return mechanism to return to the initial position. However, this method is not entirely satisfactory since spring mechanisms are not able to consistently and accurately provide the alignment required. Also, there are methods of using forces of inertia without a spring return mechanism, but the welding mechanism is far less reliable and stable without the spring return mechanism.

Also there are some devices that have a very reliable stroke adjusting mechanism, but this kind of mechanism is too heavy in weight and is expensive to produce. As a result of the weight of the very reliable stroke adjusting mechanisms, the very reliable stroke adjusting mechanisms can only be implemented in stationary strapping machines and are not suitable for a mobile, handheld, or portable strapping apparatus.

All of the above-described examples utilize the same idea of adjusting the stroke during the rotation of the driveshaft, which is still rotating is the same direction.

SUMMARY OF THE INVENTION

In an embodiment, an improved welding joint using a large stroke and high speed welding mechanism in conjunction with a reversible welding motor is provided.

In an embodiment, a welding mechanism with the ability of aligning two straps in the beginning as well as in the end of the welding operation is provided.

In an embodiment, a method for stopping the relative motion with the plastic straps with respect to each other is provided.

In an embodiment, a method for keeping the straps oriented in the same relative positions at the end of the welding operation as at the beginning is provided.

In an embodiment, an apparatus is provided that includes a particular eccentric mechanism including at least a welding motor, a motor bushing, an eccentric shaft. The welding motor is mounted on a frame. The motor bushing is fixedly attached to the rotor of the welding motor. One side of the eccentric shaft is pivotally mounted on the frame. The other side of the eccentric shaft is also pivotally mounted on the motor bushing. The eccentric bushing is pivotally mounted on the eccentric shaft. The eccentric bushing is connected through the bearing to that connecting rod, which moves the upper strap. The motor bushing is connected to the eccentric bushing only in the circumferential direction and is able to transmit the torque from the motor to the eccentric bushing. The eccentric shaft is mounted in such a way that the eccentric shaft is permitted to assume either of two stable positions in accordance to the eccentric bushing. In the first position, the longitudinal eccentric axis of eccentric bushing is co-axial with longitudinal rotating axis of the eccentric shaft and the combined eccentricity in the first position of the eccentric bushing and the eccentric shaft is zero or relatively low. In the second position, the eccentric shaft is turned to a particular angle, which for example may be 180 degrees. In an embodiment, when the eccentric shaft is turned to this particular angle, the distance between the rotation axis of the eccentric shaft and the eccentric axis of the eccentric bushing is at a maximum, which increases the eccentricity to a relatively high value or maximizes the eccentricity. Thus, in the first position, the rotation of the motor bushing does not move the connecting rod and consequently the straps continue to be aligned. In the second position, the rotation of the motor bushing results in the maximum oscillation of the eccentric bushing that is possible for the given eccentricity of the eccentric bushing and eccentric shaft, and consequently the reciprocation applied to the upper strap has the maximum amplitude that is possible for the combination of the eccentric bushing and eccentric shaft. Accordingly, rotation of the motor shaft in first direction results in a stationary position of two straps and rotation of the motor shaft in second direction (which in an embodiment is opposite to the first direction) provides reciprocation of upper strap with a maximum amplitude and therefore high speed welding process. In an alternative embodiment, in the second position, the eccentric shaft is rotated to make an angle with the eccentric bushing that is sufficient to create enough reciprocation to weld the two straps, but is not the maximum angle and does not provide the maximum amplitude of oscillation.

It is preferable that in the low eccentricity configuration that the eccentricity be zero. The higher the eccentricity, the more misalignment of the straps in the joint. In the prior art, the misalignment could be zero or maximum (that is about 1.2 mm) and the degree of misalignment is unpredictable. In an embodiment the value of eccentricity is a certain value close to zero, and therefore the misalignment is zero or close to zero.

Also, the welding method provided may use a sequence of different directions of rotation of the motor shaft:

Rotation of the motor shaft in the first direction provides a neutral gripper positioning and at the same time engages the gripper under the pressure with the upper strap aligned with the lower strap.

Rotation of the motor shaft in the opposite (second) direction provides a high speed welding process.

After the welding is complete, immediate rotation of the motor shaft back to the first direction provides a neutral position of the gripper engaged with the upper strap, at the same time keeping the welded joint under the pressure. After the material in the adjacent area solidifies and the welding joint is complete, the gripper is raised, and the strap (that until now was under tension) is released from the strapping tool. Now, the gripper, the eccentric shaft and eccentric bushing are in initial their initial positions and the device is ready for a new cycle.

The method and apparatus for high speed plastic strapping welding are explained in more detail with reference to examples of embodiments in the description given below with reference to the drawings. Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Rapid heating is a solution to solve the problem of the welding process lowering the breaking point of the strap, while at the same time consumes less energy and shortens the cooling time for the welded joint.

In order to attain the rapid heating, a given amount of heat must be applied within a minimal time window into a segment of the two straps that is bounded to be relatively close to the welded interface. High heat may be generated with the use of high frequency reciprocation (which is an oscillatory motion). However, the high frequency reciprocation is usually limited by mechanical design and is not widely used in mobile strapping apparatuses.

Also the rapid heating can be achieved by increasing the pressure between two straps in the welded region, the amount of pressure is usually limited for some kinds of strap, such as polypropylene (and straps made from other similar compounds) due to molecular structure of the strap.

Although the stroke of reciprocation can be increased, the trailing edge of the vibrated strap exposes a portion of the stationary strap as the leading edge of the vibrated strap moves beyond the corresponding edge of the stationary strap. It is desirable that the plastic straps be oriented in the same relative positions at the end of the welding operation as at the beginning. However, if an increased stroke of reciprocation is applied, more attention needs to be paid to keep the straps aligned.

FIG. 1 schematically illustrates a conventional strapping tool during the operation of tightening and sealing the strap overlapped about an article. Typically, all strapping tools constructed with three major components, which includes a tightening device 1, a sealing mechanism 2, and a base 3. The tightening device 1 includes a feedwheel 11 pivotally mounted on the pin 12. The feedwheel interacts through the upper strap 41 and lower strap 42, and gripper 13. Gripper 13 is situated in the receptacle 32 of the base 31. FIG. 1 schematically shows the sealing mechanism 2 represented by upper gripper 21 and lower gripper 22 situated in the receptacle 33 of base 31 and a cutter 23 intended to cut free end 43 of the strap 4.

During the tensioning process the gripper 13 holds the lower portion 42 of the strap 4 overlapped about the article 5. Rotation of the feedwheel 11 causes tightening of the upper portion 41 of strap 4 therefore the lower portion 42 of the strap 4 is loaded with full amount of tension force P.

FIGS. 2a-7b include the following components, welding motor 200, a frame 201, motor bushing 202, motor shaft 203, bearing 205, bearing 206, eccentric bushing 207, bearing 208, connecting rod 209, pin 210, vertical link 211, pin 212, gripper 213, upper link 214, pin 215, pin 216, main spring 217, lock spring 220, pin 221, lock arm 222, lock bracket 223, clutch 224, pin 225, set screw 226, eccentric axis 231, eccentric shaft 240, longitudinal rotation axis 241, and longitudinal eccentric axis 242.

Figure 2A:
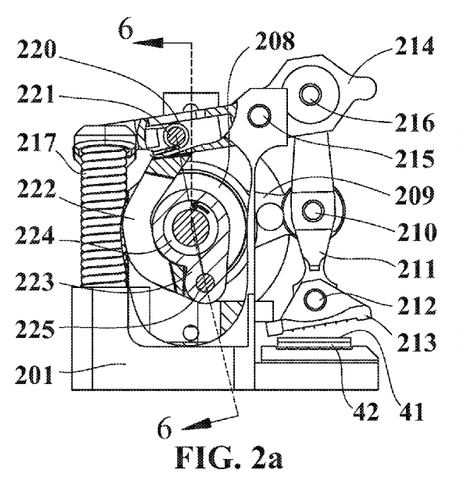
FIG. 2a is a schematic representation with a broken-out section of part of the friction welding apparatus of the present invention in an initial position.
Figure 2B:
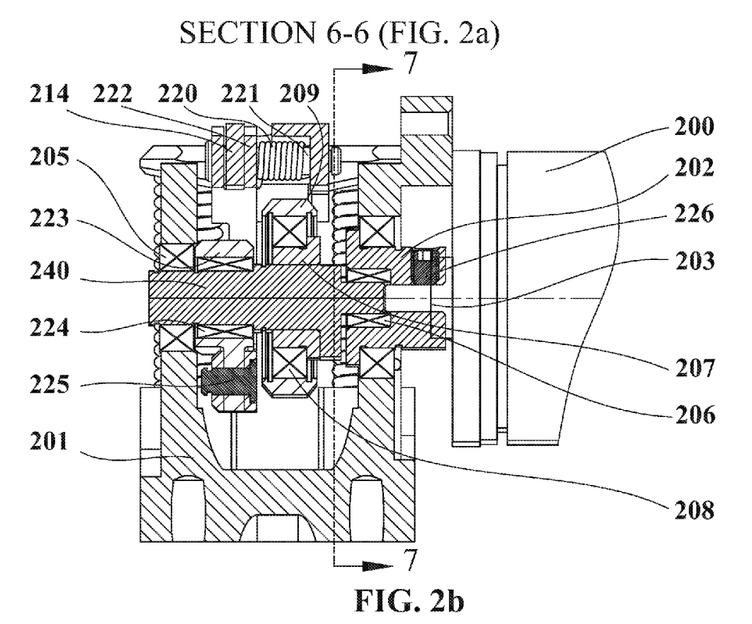
FIG. 2b is a cross section of the friction welding means according to the present invention.

Referring to FIGS. 2a and 2b, the welding apparatus may include a welding motor 200 mounted on a frame 201. The welding apparatus may also include a motor bushing 202 fixedly attached to the rotor 203 of the welding motor 200. An eccentric shaft 240 is pivotally mounted on the frame 201 through the bearing 205 from one side (which is the left side of FIG. 2b). On the other side of the eccentric shaft 240 (which is towards the right side of FIG. 2b), the eccentric shaft 240 is pivotally mounted on the motor bushing 202 through the bearing 206. Eccentric bushing 207 is pivotally mounted on the eccentric shaft 240. The eccentric bushing 207 is connected through the bearing 208 to connecting rod 209. Connecting rod 209 moves the upper strap through pin 210, vertical link 211, pin 212 and gripper 213. The upper link 214 is pivotally mounted on the frame 201 through pin 215, and the upper link 214 bears the vertical link 211 through pin 216 (see the right side of FIG. 2a). The upper link 214, from another side (which is on the left side of FIG. 2a), is pressed against main spring 217.

The apparatus shown in FIG. 2a additionally has a lock constructed of lock spring 220, pin 221, lock arm 222, and lock bracket 223. Pin 221 rests on upper link 214. The lock bracket 223 is connected to the lock arm 222 through pin 225 and to the eccentric shaft 204 through one way clutch 224. The one way clutch 224 transmits a torque in a clockwise direction, when eccentric shaft 204 rotates. The one way clutch 224 transmits a torque in a counter clockwise direction, when lock bracket 223 rotates counter clockwise and permits rotation of the eccentric shaft 204 in counter clockwise direction.

The eccentric bushing 207 is pivoted about longitudinal eccentric axis 242 of the eccentric shaft 240. So the longitudinal eccentric axis 242 of the eccentric shaft 240 is always co-axial with longitudinal rotation axis 230 of the eccentric bushing 207. Consequently, when eccentric shaft 240 is in the position of FIG. 4a, longitudinal rotation axis 241 of eccentric shaft 240 is co-axial with longitudinal eccentric axis 231 of the eccentric bushing 207. When eccentric shaft is changing positions, eccentric bushing 207 rotates about eccentric axis 242 of the eccentric shaft 240, so that after rotation 180 degrees, longitudinal rotation axis 241 of the eccentric shaft 240 is at maximum distance from longitudinal eccentric axis 231 of the eccentric bushing 207 causing longitudinal eccentric axis 231 of the eccentric bushing 207 to orbit as the motor turns motor bushing 202 about longitudinal rotation axis 241 of the eccentric shaft 240. The orbiting of longitudinal eccentric axis 231 about longitudinal rotation axis 241 creates the oscillatory motion of eccentric bushing 207, which is translated to gripper 213.

Figure 2C:
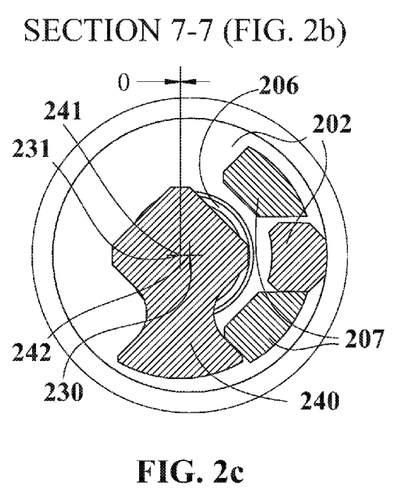
FIG. 2c is a cross section of the friction welding means in eccentric shaft area (eccentric area) in initial position.
Figure 4A:
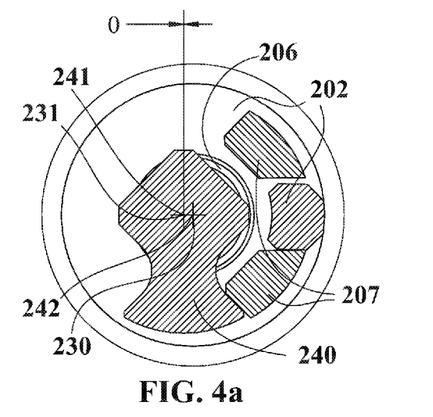
FIG. 4a is a cross section of the eccentric area in an initial position.
Figure 4B:
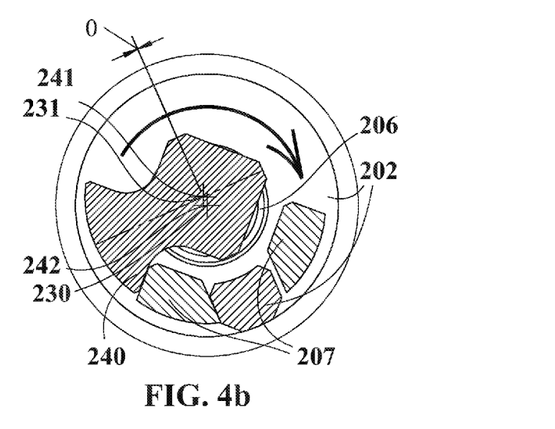
FIG. 4b is a cross section of the eccentric area at the beginning of the welding process.
Figure 4C:
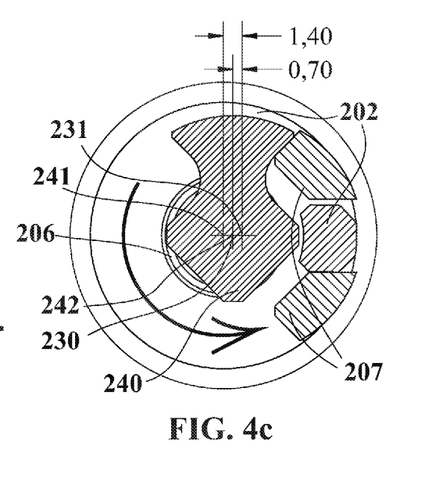
FIG. 4c is a cross section of the eccentric area during the welding process.

Referring next to FIG. 2c, the longitudinal rotation axis 241 of eccentric shaft 240 is co-axial with motor bushing 202. The longitudinal eccentric axis 242 of eccentric shaft 240 is co-axial with longitudinal rotation axis 230 of eccentric bushing 207. At the same time, longitudinal eccentric axis 231 of eccentric bushing 207 is concentric to the bearing 208 and therefore connecting rod 209. The motor bushing 202 is connected to the eccentric bushing 207 only in the circumferential direction and is able to transmit the torque from the motor 200 to the eccentric bushing 207. The eccentric shaft 240 is mounted in such a way that eccentric shaft 240 is permitted to assume either of two positions, in accordance to the eccentric bushing 207. In first position (FIG. 2c), the longitudinal eccentric axis 231 of eccentric bushing 207 is co-axial with longitudinal rotation axis 241 of eccentric shaft 240. In the configuration of FIG. 2c, the combined eccentricity of eccentric bushing 207 and eccentric shaft 240 is minimal or zero, if the value of eccentricity for eccentric shaft 240 and eccentric bushing 207 are equal. In second position, the eccentric shaft 240 is turned to a particular angle, which may be 180 degrees from the initial orientation of the eccentric shaft, for example. Depending on the eccentric bushing 207 (as shown in FIG. 4c), after turning the eccentric shaft 180 degrees, the distance between the longitudinal rotation axis 241 and longitudinal eccentric axis 231 is maximized. Therefore, in the first position, the rotation of the motor bushing 202 does not move the connecting rod 209. Since connecting rod 209 does not move in the first position, straps 41 and 42 remain aligned in a neutral position. In the second position, the rotation of the motor bushing 202 causes a maximum amount of oscillation of the eccentric bushing 207. As a result of the oscillation, the reciprocation applied to the upper strap with maximum amount of amplitude. Accordingly, the rotation of the motor shaft 203 in a first direction results in the two straps being held in fixed stationary neutral position and do not move with respect to one another. Rotation of the motor shaft 203 in the second direction (opposite to the first direction) causes reciprocation that is applied to upper strap 41 with maximum amplitude and therefore create sufficient heat to provide a high speed welding process.

The above described example of embodiment utilizes a method of operation according to this invention as follows:

After the strap 4 has been placed around the article 5, and after the strap ends 41 and 42 have been inserted in the strapping tool, the strap is tensioned to a desired tension force, by tightening device with the gripper 213 in a raised position. After tensioning with the gripper in the raised position, the welding apparatus is in the position illustrated in FIG. 3a. Lock arm 222 and lock bracket 223 are pressed by lock spring 220 in a counterclockwise direction, and form the lock. When lock arm 222 and lock bracket 223 are pressed by lock spring 220 in a counterclockwise direction, lock arm 222 and lock bracket 223 hold upper link 214 and therefore gripper 213 in raised position. When in the locked position, with gripper 213 raised, the eccentric shaft 240 is in the position illustrated in FIG. 4a so that the eccentricity of the eccentric mechanism is zero.

In order to weld the strap ends 41 and 42, the operation mode begins by turning the motor shaft 203 clockwise (first direction). As a result, the motor shaft 203 turns the lock bracket 223 through the motor bushing 202, eccentric bushing 207, eccentric shaft 240 and one way clutch 224. The movement of the lock bracket 223 overcomes the torque of lock spring 220, and causes the lock arm 222 to swivel in a clockwise direction.

The swivel of lock arm 222 produces the following effects:

The eccentric mechanism is placed into a neutral position. Having the eccentric mechanism in the neutral position ensures that gripper 213 is in a neutral position.

Figure 3A:
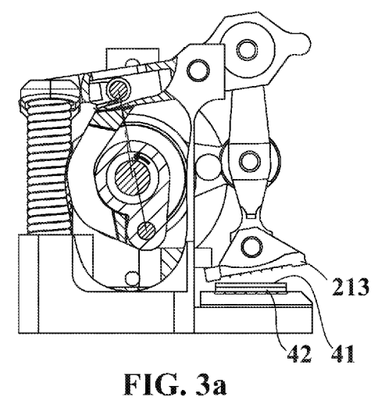
FIG. 3a is a schematic representation with a broken-out section of part of the friction welding apparatus of the present invention in an initial position.
Figure 3B:
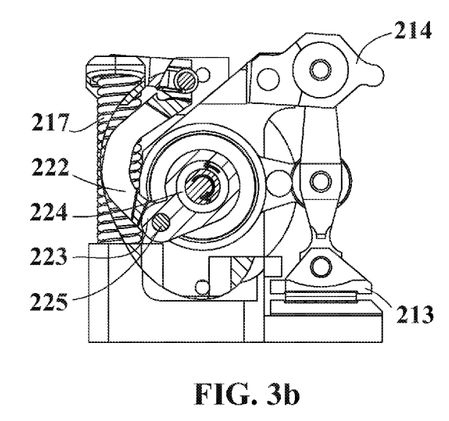
FIG. 3b is a schematic representation with a broken-out section of part of the friction welding apparatus of the present invention in the beginning of welding process.
Figure 3C:
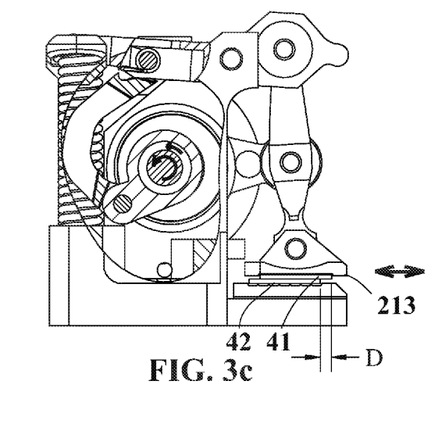
FIG. 3c is a schematic representation with broken-out section of part of the friction welding apparatus of the present invention during the welding process in maximum amplitude of oscillation shown.

The lock is unlocked, and the upper link 214 is allowed to move clockwise. Moving the upper link 214 clockwise brings the gripper 213 in contact with upper strap 41 under the pressure of main spring 217 (FIGS. 3b and 4b).

After the gripper 213 is in contact with upper strap 41, the welding process begins by turning motor shaft 203 counter clockwise (second direction) (FIG. 3c), which in turn puts eccentric shaft 240 in position illustrated in FIG. 4c and therefore sets gripper in motion. Thus, welding process occurs with maximum amplitude of oscillation.

Figure 3D:
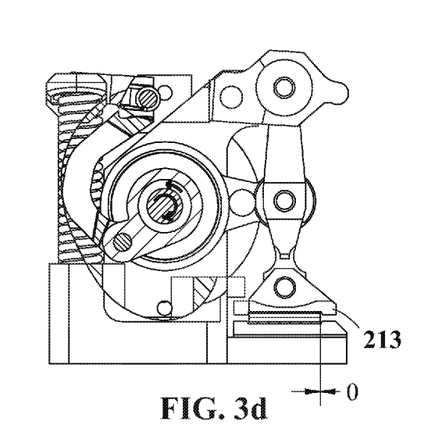
FIG. 3d is a schematic representation with broken-out section of part of the friction welding apparatus of the present invention at the end of the welding process when the joint solidifies.
Figure 4D:
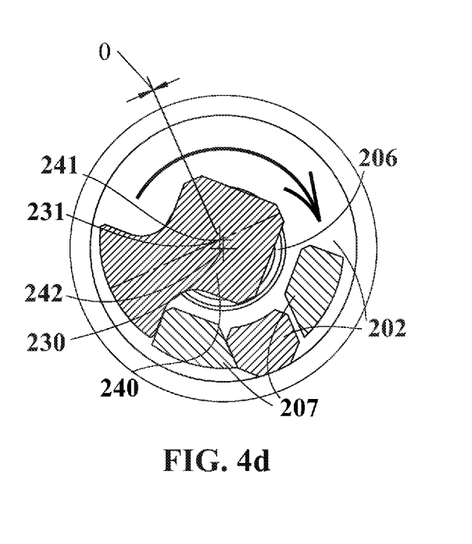
FIG. 4d is a cross section of the eccentric area in the end of the welding process, while the joint is solidifying.

After welding is complete, but while the material in welded area is still soft, the motor shaft 203 immediately turns backward in the opposite direction, which is clockwise (first direction) (in FIG. 3d). Turning the motor shaft backwards—in first direction—causes the gripper 213 to be in a neutral position (as illustrated in FIG. 4d) in which gripper 213 is engaged with the upper strap. Placing gripper 213 so that gripper 213 is engaged with the upper strap 41 in neutral position sets the vertical alignment of upper strap 41 and lower strap 42 as the vertical alignment was in the beginning of the welding process. The welded joint is allowed to cool down under the pressure of gripper 213 until material in the joint area solidifies.

Figure 3E:
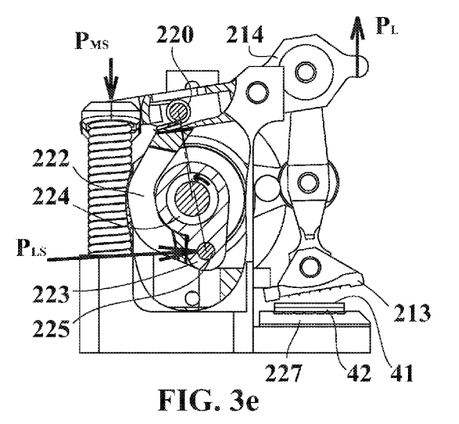
FIG. 3e is a schematic representation with broken-out section of part of the friction welding apparatus of the present invention in initial position with lock arms locked.
Figure 4E:
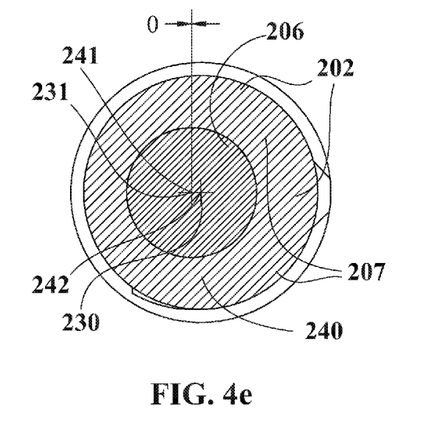
FIG. 4e is a cross section of the eccentric area in initial position with lock arms locked.
Figure 5:
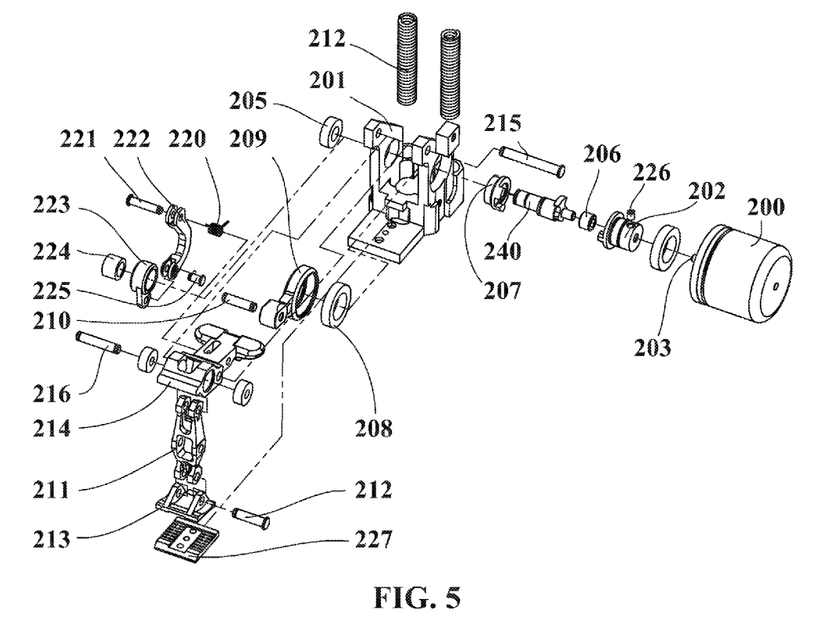
FIG. 5 is an exploded view of the friction welding apparatus.
Figure 6A:
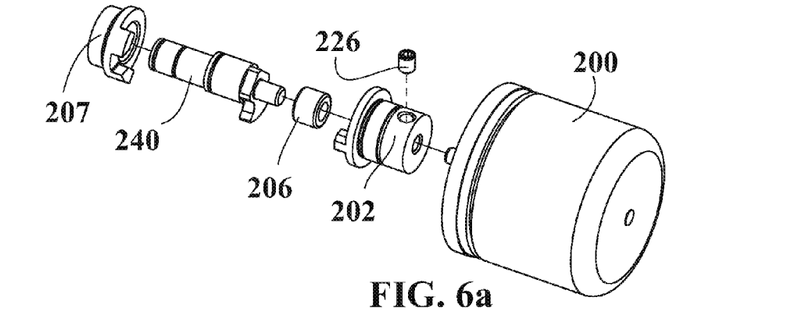
FIG. 6a is an exploded view of the main elements of the eccentric mechanism in an initial position.
Figure 6B:
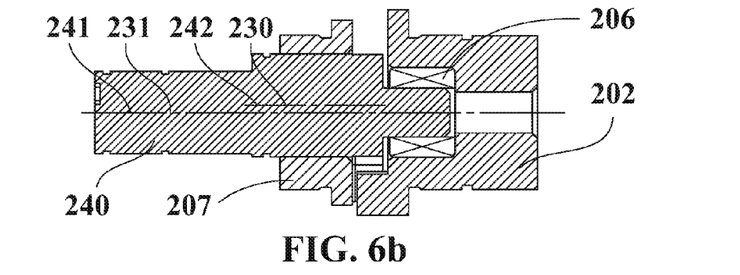
FIG. 6b is a cross section view of the main elements of the eccentric mechanism in an initial position.
Figure 7A:
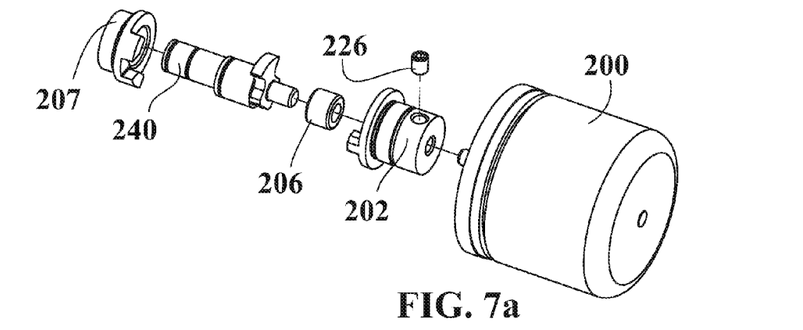
FIG. 7a is an exploded view of the main elements of the eccentric mechanism during the welding process in maximum amplitude of oscillation shown.
Figure 7B:
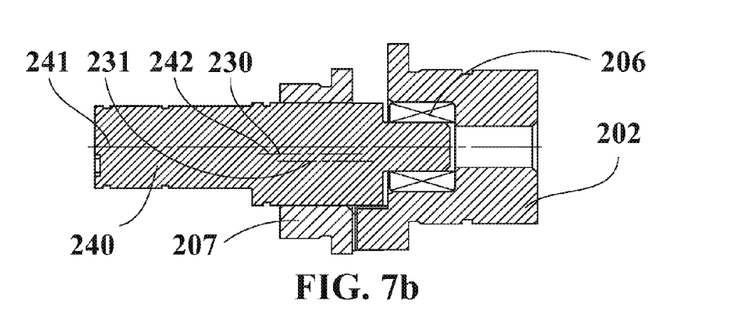
FIG. 7b is a cross section view of the main elements of the eccentric mechanism during the welding process in maximum amplitude of oscillation shown.

In order to free the strap 4, gripper 213 rises up, upper link 214 swivels counter clockwise pressing down the main spring 217 until lock arm 222 (under the torque of the lock spring 220) moves to the locked position shown in FIGS. 3e and 4e, which is the initial position. An operator can now remove the strap and the strapping tool is ready for a new cycle.

Figure 8A:
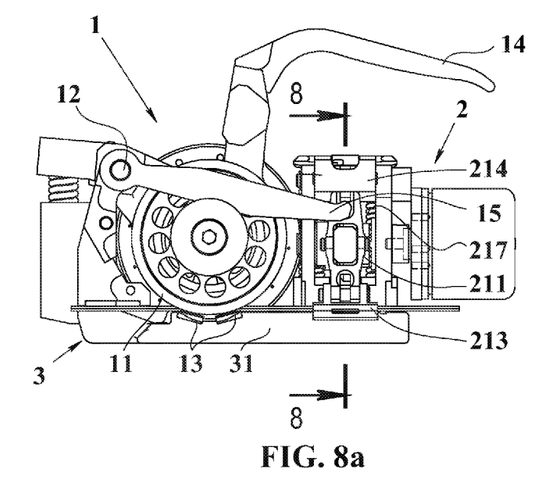
FIG. 8a shows the mechanism for engaging and releasing gripper, in the engaged position, pushing the gripper onto a portion of the upper strap.
Figure 8B:
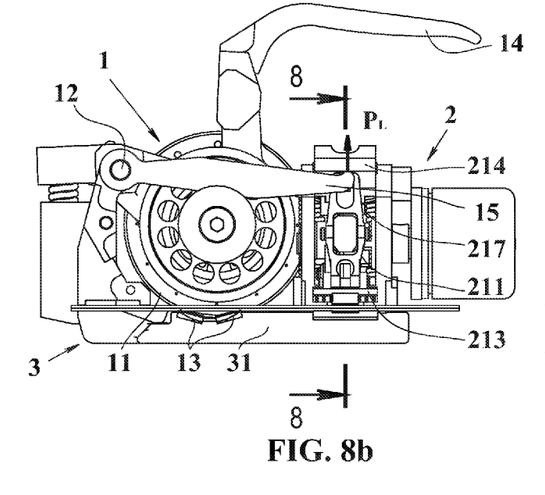
FIG. 8b shows the mechanism for engaging and releasing the gripper, in the release position, allowing the welding apparatus to be removed from the strap.

FIGS. 8a and 8b show the mechanism for engaging and releasing gripper 213, in two positions. In FIG. 8a the position of the mechanism corresponds with FIGS. 3b (and 3d). This is initial position for lifting the gripper 213 and compressing the spring 217. In FIG. 8b the position of the mechanism corresponds with FIGS. 2a (and 3a). An operator lifts the handle 14 and lever 15 moving up raises the right portion of the upper link 214 compressing the spring 217 by the left portion of upper link 214.

Figure 9A:
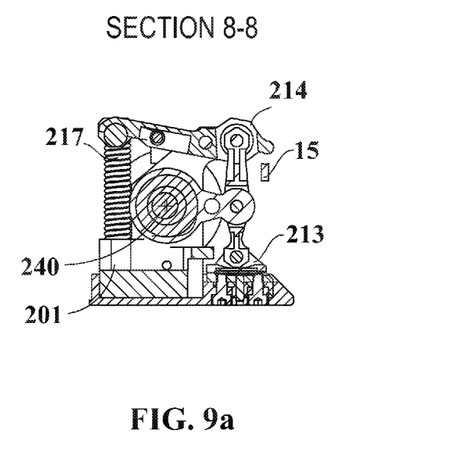
FIG. 9a shows a cross sectional view of the mechanism for engaging and releasing the gripper, in the engaged position, pushing the gripper on a portion of the upper strap (along line 8-8 of FIG. 8a)
Figure 9B:
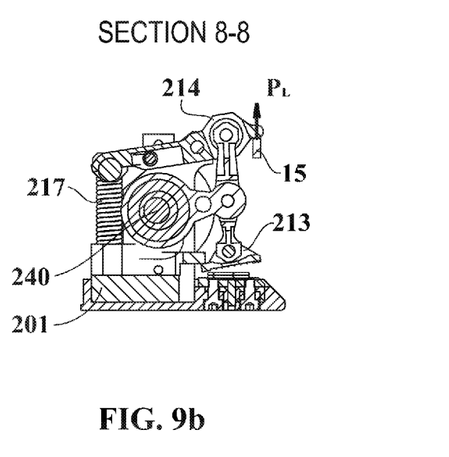
FIG. 9b shows a cross sectional view of the mechanism for engaging and releasing the gripper, in the release position, allowing the welding apparatus to be removed from the strap (along line 8-8 of FIG. 8b)
Figure 10A:
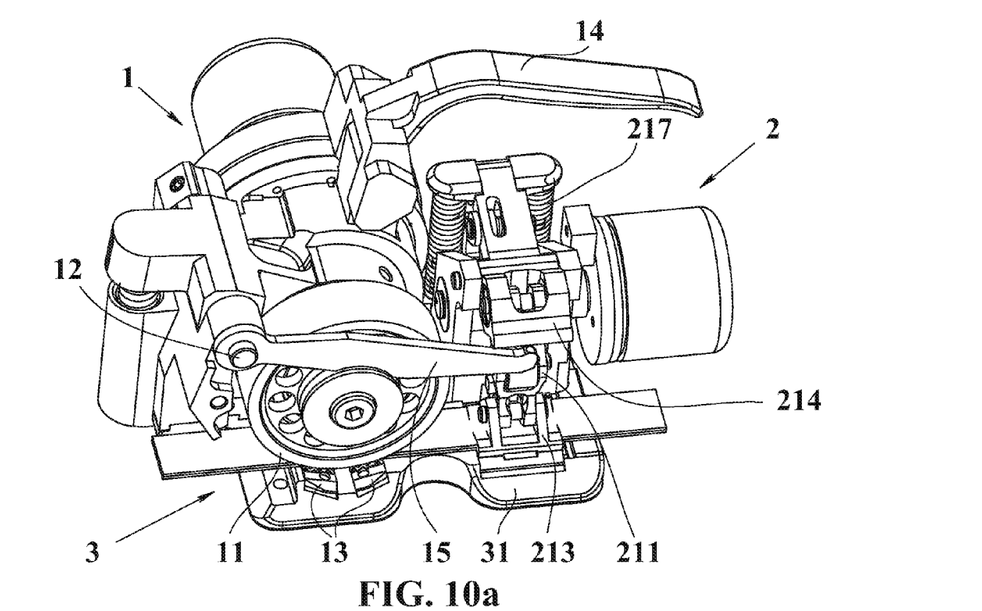
FIG. 10a shows a perspective view of the mechanism for engaging and releasing the gripper, in the engaged position, pushing the gripper on a portion of the upper strap.
Figure 10B:
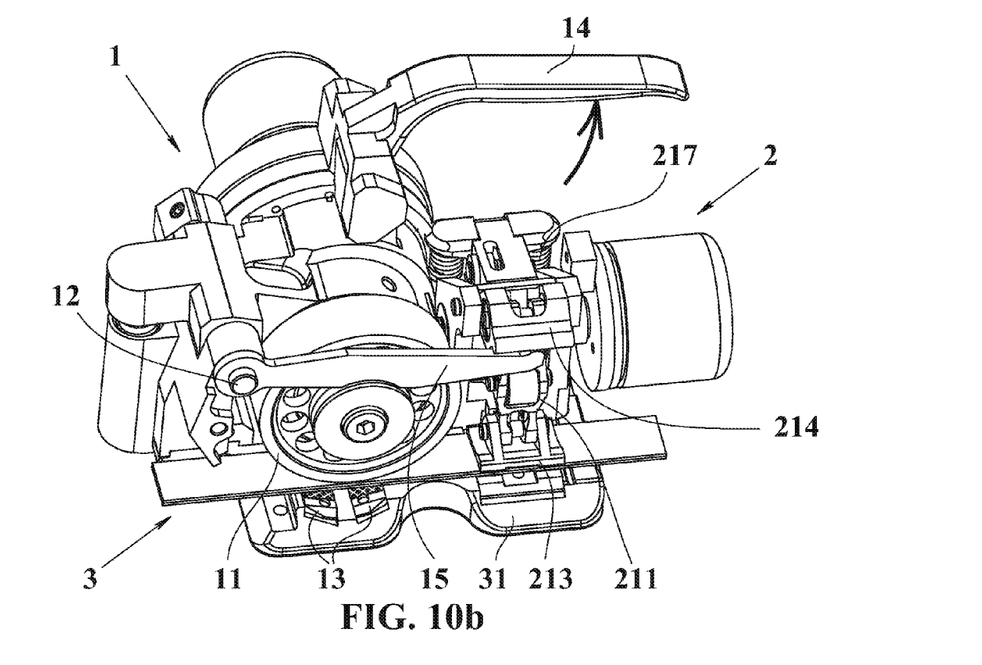
FIG. 10b shows a perspective view of the mechanism for engaging and releasing the gripper, in the released position, allowing the welding apparatus to be removed from the strap.
Figure 11A:
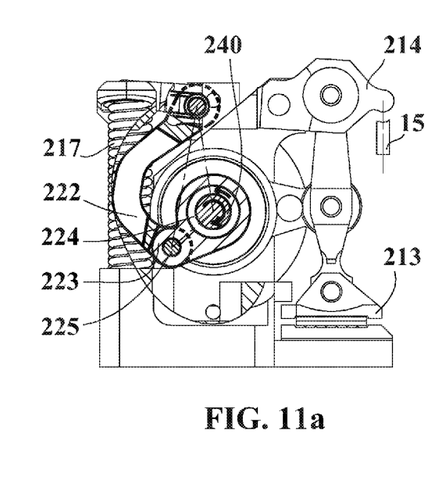
FIG. 11a shows a cross sectional view of the lock mechanism in the unlocked position.
Figure 11B:
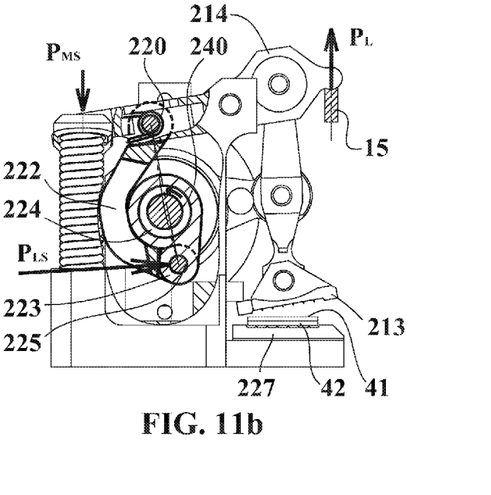
FIG. 11b shows a cross sectional view of the lock mechanism in the locked position.
Figure 12A:
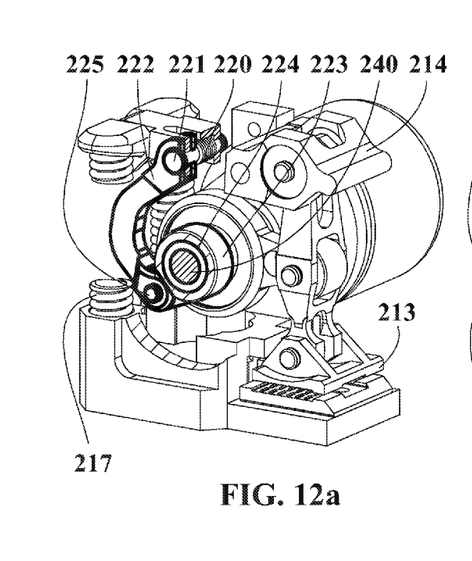
FIG. 12a shows an isometric view of the locked mechanism in an unlock position.
Figure 12B:
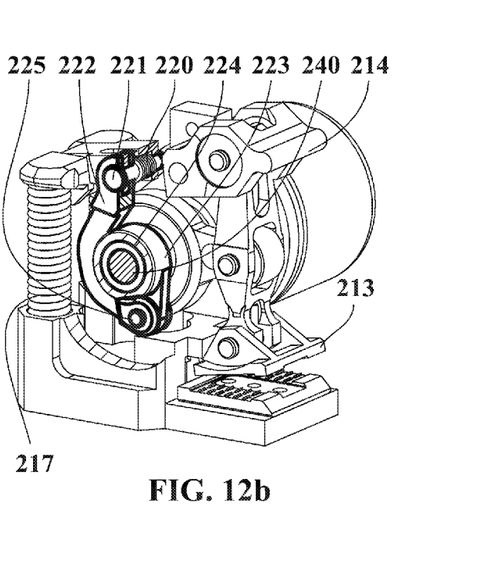
FIG. 12b shows an isometric view of the locked mechanism in the locked position.

FIG. 9a shows a cross sectional view of the mechanism for engaging and releasing gripper, in the engage position, pushing the gripper on a portion of the upper strap (along line 8-8 of FIG. 8a);

FIG. 9b shows a cross sectional view (along line 8-8 of FIG. 8b) of the mechanism for engaging and releasing the gripper, in the release position, allowing the welding apparatus to be removed from the strap. FIG. 10a shows a perspective view of the mechanism for engaging and releasing gripper, in the engaged position, pushing the gripper on a portion of the upper strap. FIG. 10b shows a perspective view of the mechanism for engaging and releasing gripper, in the released position, allowing the welding apparatus to be removed from the strap. FIG. 11a shows a cross sectional view of the lock mechanism in unlocked position. FIG. 11b shows a cross sectional view of the lock mechanism in locked position. FIG. 12a shows an isometric view of the lock mechanism in an unlocked position. FIG. 12b shows an isometric view of the lock mechanism in locked position.

It can be seen from the description above that using the high speed welding method and the welding apparatus of FIGS. 2a-11b gives numerous advantages including lower energy consumption by the welding process, which in turn, enables usage of lighter and cheaper batteries, and shortens cooling time of the welding joint thereby increasing productivity of the strapping tool. Also, as a result of having a shallower adjacent area of the welding joint that is heated, the threshold level of the strap tension increases, which allows a fuller utilization of the strap properties. Further, having a shallower area that is heated, enables usage of a narrower strap (as compared to were a deeper heating process used), without breaking. As a result of being able to use narrower or thinner straps, the entire packaging process is more economical and energy efficient. Also, in experiments applying the method to a polyester strap with 16 mm width and 1 mm thickness and breaking strength about 650 kg, the straps welding joint has up to a 95% of the breaking strength of the strap (compared to up to 80% in conventional tools), which in turn makes the packaging process more reliable.

This invention is not restricted to the embodiments that have been described and illustrated. Rather, numerous changes and additions are possible without departing from the scope of the invention.

Each embodiment disclosed herein may be used or otherwise combined with any of the other embodiments disclosed. Any element of any embodiment may be used in any embodiment. Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. The method comprising:
    placing a first portion of plastic in contact with a second portion of plastic;
    turning a motor shaft in a first direction which releases a lock and allows an upper link to pivot, so that another side of the upper link pushes down on a vertical link, pushing down a gripper that engages with an upper strap under a force of a main spring, such that when the first portion of plastic is in contact with the gripper, the first portion of plastic is between the gripper and the second portion of plastic;
    as a result of turning the motor shaft in the first direction, the motor shaft engaging an eccentric shaft in a first configuration in which a rotating axis of the eccentric shaft is coaxial with an eccentric axis of an eccentric bushing creating a non-eccentric neutral position of the eccentric bushing; and
    the non-eccentric neutral position of the eccentric bushing causing a vertical link to be engaged with the eccentric bushing in a non-oscillatory neutral position of the vertical link, causing the gripper to exert a force, resulting from the main spring, on the first portion of plastic, holding the first portion of plastic in place on the second portion of plastic aligned in a neutral position.

2. A method of claim 1 further comprising:
    turning the motor shaft in a second direction;
    as a result of turning the motor shaft in the second direction, the motor shaft engaging the eccentric shaft in a second configuration in which the rotating axis of the eccentric shaft is not coaxial with the eccentric axis of the eccentric bushing, the rotating axis of the eccentric shaft is not coaxial with the eccentric axis of the eccentric bushing creating an eccentricity in a rotation of the eccentric bushing when the motor shaft rotates, the rotation of the bushing having the eccentricity being an eccentric rotation of the eccentric bushing;
    translating the eccentric rotation of the eccentric bushing to an oscillatory motion of the vertical link engaged with the eccentric bushing, causing an oscillatory motion of the gripper, which moves the first piece of plastic over the second piece of plastic, thereby creating friction; as a result of the friction, heating and melting a portion of the first and second pieces of plastic in adjacent area.

3. The method of claim 2, the turning of the motor shaft in the first direction occurs prior to the turning of the motor shaft in the second direction, the method further comprising:
    after the turning of the motor shaft in the second direction, turning the motor shaft back to the first direction;
    as a result of the turning the motor shaft back to the first direction, the motor shaft engaging the eccentric shaft again returning the eccentric shaft to the first configuration in which the rotating axis of the eccentric shaft is coaxial with the eccentric axis of the eccentric bushing recreating the non-eccentric neutral position of the eccentric bushing;
    in association with the eccentric bushing being in the non-eccentric neutral position of the eccentric bushing causing the vertical link engaged with the eccentric bushing to be in a non-oscillatory neutral position of the vertical link engaged with the eccentric bushing,
    the vertical link being in the non-oscillatory neutral position of the vertical link causing the gripper to exert a force, where the force exerted by the gripper results from the main spring, the force exerted by the gripper being exerted on the first portion of plastic holding the first portion of plastic in place on the second portion of plastic;
    while the motor shaft is turning in the first direction, allowing the first portion of plastic and the second portion of plastic to cool and solidify in a neutral position of the gripper; and
    after the first portion of plastic and second portion of plastic have solidified, releasing the first portion of plastic and second portion of plastic from the gripper.

4. The method of claim 1, further comprising:
    while the motor shaft is turning in the first direction, allowing the first portion of plastic and the second portion of plastic to cool and solidify in a neutral position of the gripper; and
    after the first portion of plastic and second portion of plastic have solidified, releasing the first portion of plastic and second portion of plastic from the gripper.

* * * * *